UNITED STATES PATENT OFFICE.

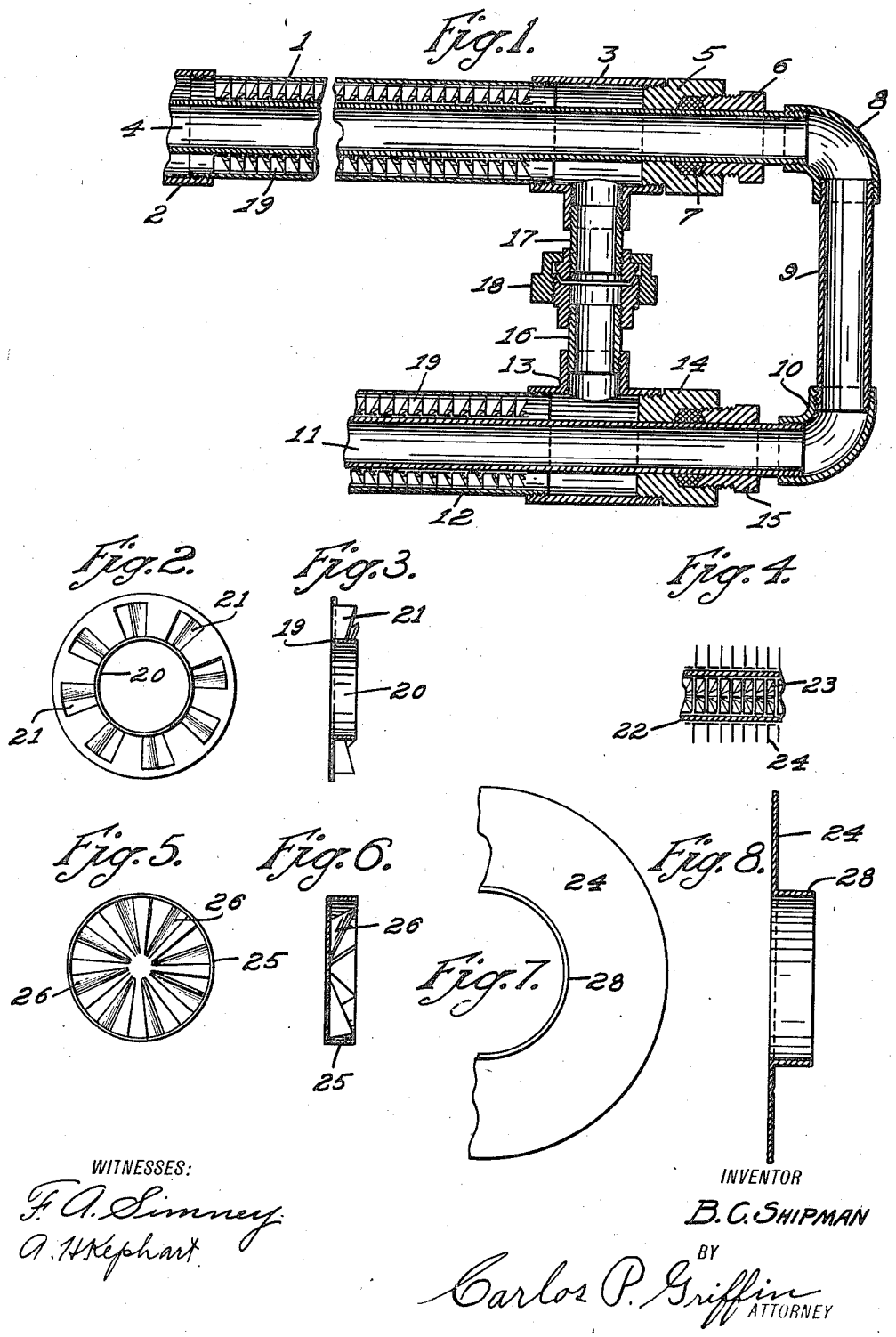

BENNET CARROLL SHIPMAN, OF SAN FRANCISCO, CALIFORNIA.

HEAT-TRANSFERRING APPARATUS.

1,148,865.　　　　Specification of Letters Patent.　　Patented Aug. 3, 1915.

Application filed December 7, 1912. Serial No. 735,443.

*To all whom it may concern:*

Be it known that I, BENNET C. SHIPMAN, a citizen of the United States, residing at San Francisco, in the county of San Francisco and State of California, have invented a new and useful Heat-Transferring Apparatus, of which the following is a specification in such full and clear terms as will enable those skilled in the art to construct and use the same.

This invention relates to a heat transferring apparatus used for either heating or cooling fluids, and its object is to provide means whereby a greater area of metal may be presented to the heating or cooling fluid used than is possible with the ordinary heat transferring apparatus.

Another object of the invention is to insure the fluid being heated or cooled as the case may be passing in contact with as much metal as possible, the device having means whereby the fluid is caused to travel circuitously in its passage therethrough.

In the drawings in which the same numeral of reference is applied to the same portion throughout the several views, Figure 1 is a longitudinal view through a portion of the complete apparatus, Fig. 2 is a front elevation of one of the flanges used for causing the fluid to be heated or cooled to travel circuitously through the apparatus, Fig. 3 is a vertical sectional view of one of said flanges, Fig. 4 is a longitudinal sectional view of a section of pipe having a slightly modified form of cooling flanges therein with straight exterior flanges for air cooling the exterior thereof, Fig. 5 is a front elevation of one of the interior flanges used in the pipe shown in Fig. 4, Fig. 6 is a sectional view of one of said interior cooling flanges, Fig. 7 is a front elevation of a portion of one of the exterior cooling flanges, and Fig. 8 is a sectional view of one of the exterior cooling flanges used on the pipe shown in Fig. 4.

The numeral 1 represents a section of pipe having a suitable fitting 2 at one end and a T coupling 3 at the other end. Passing through the pipe 1 and fittings carried thereby is a smaller pipe 4. This pipe passes through a packing gland 5 screwed in the T coupling 3, said gland carrying a packing nut 6 which with the packing material 7 makes a tight joint with the pipe.

An elbow 8, a short length of pipe 9 and an elbow 10 connect the pipe 4 with a small pipe 11 within the pipe 12. The pipe 12 is connected with a T coupling 13, which has a packing gland 14 and packing nut 15, precisely the same as the T coupling 3. The two T couplings 3 and 13 are connected by means of short pieces of pipe 16 and 17 and a union 18 of a well known type. Surrounding the inner pipe and tightly secured thereon are a series of flanges 19. The flanges 19 are made of thin metal and have a ring 20 to determine the spacing of one flange with respect to the next adjacent flange on the pipe. These flanges have wings 21 cut therein, which wings are so inclined as to cause any fluid as air or water passing around the pipe 4 and through the inner pipe 1 to travel spirally and come in contact with all of the flanges.

The form of the invention shown in Fig. 1 is used where it is desired to transfer heat from one fluid to another fluid, where it is not desired that either fluid shall be free in the atmosphere. However, the invention is equally applicable to a heat transferring apparatus where the air is used as the exterior element for heat transferring. Such a modified form of the invention is shown in Figs. 4 to 8 inclusive. In this form of the invention the pipe is indicated at 22, the interior cooling flanges at 23 and 24 indicates the exterior cooling flanges. The interior cooling flanges have rings 25 formed at their outer edge to determine the spacing of said cooling elements one from the other, and they are provided with a series of inclined vanes 26 cut therein, said vanes causing any fluid passed through said pipe to travel circuitously and to successively pass each of said series of cooling elements in the pipe.

In order to increase the heat transferring capacity of the apparatus when used with respect to air, as the exterior element, plain flanges 24 with spacing rings 28 are tightly fitted over the pipe, thus increasing the metallic area in contact with the air to any amount desired. The main feature of the invention, however, lies in the use of vanes which cause a circuitous travel of the fluid being cooled through the system, thereby causing the fluid to impinge against as great an amount of conducting surface as is necessary for the given apparatus, with a relatively decreased length of pipe.

Having thus described my invention what

I claim as new and desire to secure by Letters Patent of the United States, is as follows:

1. A disk for heat transferring apparatus comprising a plate carrying a spacing ring and having a series of openings therein, with vanes adjacent said openings, substantially as described.

2. A disk for heat transferring apparatus comprising a plate having a spacing flange formed thereon and having a series of openings formed in the body of the plate, said plate also having a series of inclined vanes adjacent the openings therethrough, substantially as described.

3. A heat transferring apparatus comprising a pipe, and a series of disks transversely placed therein, each disk having a spacing ring and a plurality of openings and vanes or wings adjacent said openings, substantially as described.

4. A double pipe heat transfer apparatus comprising a pair of pipes one within the other, flanges surrounding the inner pipe, and means carried by the flanges and inclined to the plane thereof to present an increased conducting surface to a fluid passing through the annular space between the two pipes, substantially as described.

5. A disk for heat transferring apparatus comprising a plate having a spacing ring formed thereon and having openings punched therein and having integral wings adjacent said openings, substantially as described.

6. A heat transferring apparatus comprising a pipe, and a series of spaced disks in said pipe, said disks each comprising a plate having a spacing ring and transversely extending flanges with openings therethrough, and wings extending therefrom adjacent the openings to increase the surface in contact with the fluid to be cooled, substantially as described.

In testimony whereof I have hereunto set my hand this 27th day of November A. D. 1912, in the presence of the two subscribed witnesses.

BENNET CARROLL SHIPMAN.

Witnesses:
C. P. GRIFFIN,
ALBERT B. MANN.